US012725741B2

(12) United States Patent
Bi et al.

(10) Patent No.: US 12,725,741 B2
(45) Date of Patent: Sep. 1, 2026

(54) SOLID STATE CIRCUIT BREAKER

(71) Applicant: Schneider Electric (China) Co., Ltd., Beijing (CN)

(72) Inventors: Baoyun Bi, Beijing (CN); Ying Shi, Shanghai (CN); Jiamin Chen, Beijing (CN); Qing Yang, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 151 days.

(21) Appl. No.: 18/391,509

(22) Filed: Dec. 20, 2023

(65) Prior Publication Data

US 2025/0105614 A1 Mar. 27, 2025

(30) Foreign Application Priority Data

Sep. 22, 2023 (CN) ......................... 202322591724.5

(51) Int. Cl.
*H01H 9/54* (2006.01)
*H02H 3/05* (2006.01)

(52) U.S. Cl.
CPC .............. *H01H 9/548* (2013.01); *H02H 3/05* (2013.01)

(58) Field of Classification Search
CPC ................................ H02H 3/05; H01H 9/548
See application file for complete search history.

(56) References Cited

U.S. PATENT DOCUMENTS

2010/0277846 A1* 11/2010 Koshin .................. H01H 9/548 361/101
2020/0365346 A1* 11/2020 Telefus ................... H02M 1/32
(Continued)

FOREIGN PATENT DOCUMENTS

EP 2234136 A1 9/2010
EP 3945536 A1 2/2022

OTHER PUBLICATIONS

Extended European Search Report dated Jun. 3, 2024 for corresponding European Patent Application No. 23218829.2-1201, 14 pages.

*Primary Examiner* — Thienvu V Tran
*Assistant Examiner* — Christopher J Clark
(74) *Attorney, Agent, or Firm* — Wolf, Greenfield & Sacks, P.C.

(57) ABSTRACT

Embodiments of the present disclosure provides a solid state circuit breaker, comprising: a first switch; a second switch, connected in series with the first switch in a circuit to be protected; an operation switch, connected to the second switch, wherein the second switch is closed in a case that the operation switch is in a closed position, and is opened in a case that the operation switch is in an opened position; a micro switch, connected to the operation switch, and cable of being driven to a predetermined opened position by the operation switch during the process of the operation switch being switched from the closed position to the opened position; a position detection circuit, connected to the micro switch, capable of generating an opening feedback signal in a case that the micro switch is driven to a predetermined opened position; a control unit, connected to the position detection circuit to receive an opening feedback signal, capable of generating a predetermined opening signal based on the opening feedback signal; a first on-off circuit, connected to a first output terminal of the control unit to receive a predetermined opening signal, an output terminal of the first on-off circuit being connected to a control terminal of the first switch to open the first switch under the control of a predetermined opening signal.

20 Claims, 1 Drawing Sheet

(56) References Cited

U.S. PATENT DOCUMENTS

2021/0126447 A1* 4/2021 Miller .................... H01H 71/58
2021/0234361 A1* 7/2021 Zhou ...................... H02H 3/093

* cited by examiner

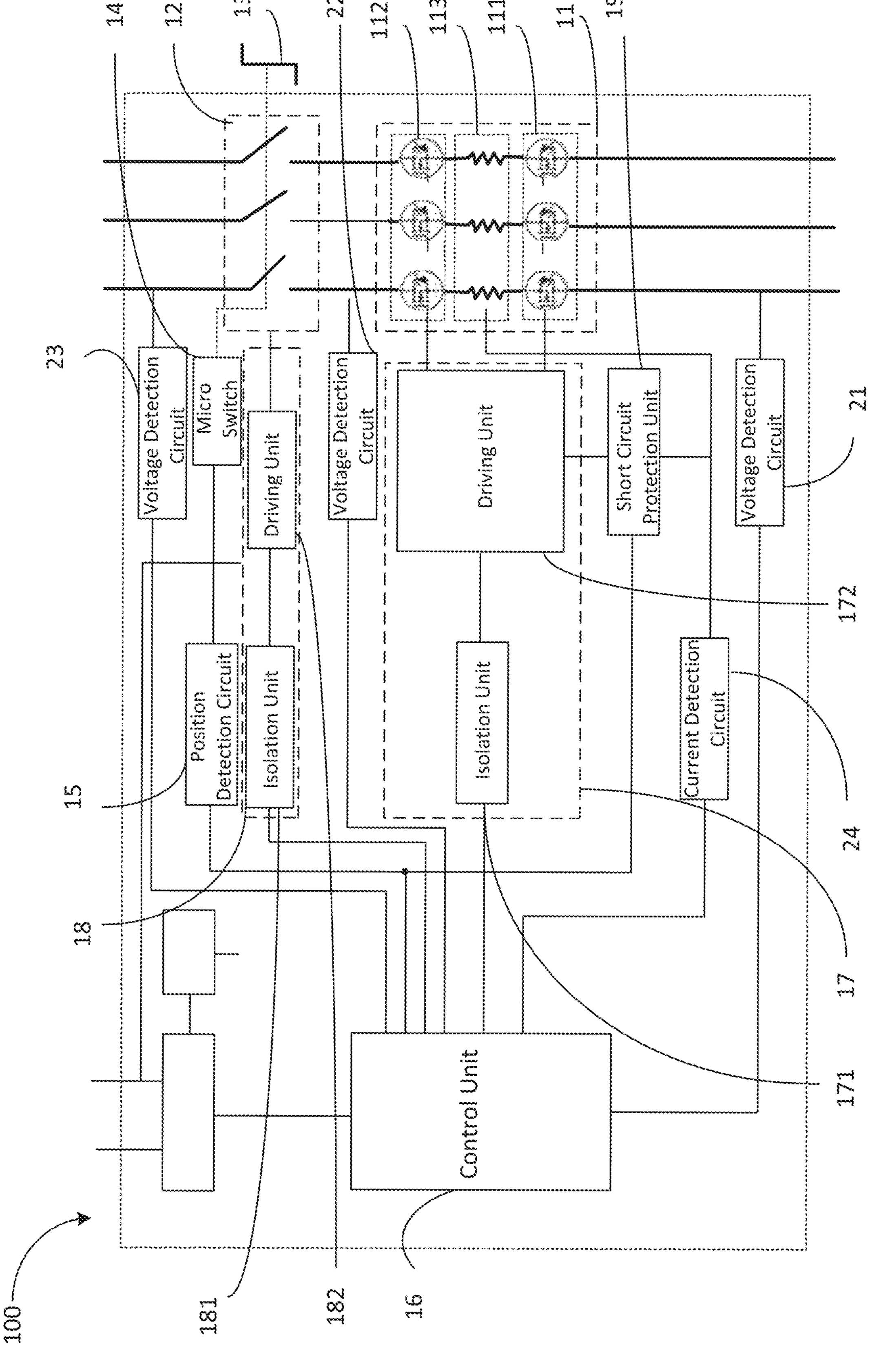
14
12
13
22
112
113
111
11
19
23
Voltage Detection Circuit
Micro Switch
Driving Unit
Voltage Detection Circuit
Driving Unit
Short Circuit Protection Unit
Voltage Detection Circuit
21
172
Position Detection Circuit
Isolation Unit
Isolation Unit
Current Detection Circuit
15
24
18
17
171
Control Unit
100
181
182
16

SOLID STATE CIRCUIT BREAKER

CROSS-REFERENCE

The present application claims priority to Chinese Patent Application No. 2023225917245, filed on Sep. 22, 2023, and entitled "SOLID STATE CIRCUIT BREAKER", the entirety of which is incorporated herein by reference.

FIELD

Embodiments of the present disclosure relates to the field of electrical equipment, and more particularly, to a solid state circuit breaker.

BACKGROUND

In the design of power semiconductor-based solid state circuit breakers, it is generally necessary to connect mechanical switches in series through power semiconductor switches to achieve physical separation. The purpose is to ensure that the solid state circuit breaker has a sufficiently large isolation distance and a sufficiently small leakage current in the opened position, thereby achieving a safety level equivalent to that of traditional circuit breakers.

There are various ways to control mechanical switches and power semiconductor switches connected in series. For example, for purely manual switches, the solid-state circuit breaker is placed in the opened state by manual operation only when maintenance is required, and the solid-state circuit breaker is in the closed state in other cases. However, if an error occurs in the manual operation, the mechanical switch may turn on or off the current, and the contacts of the mechanical switch may be affected by the arc. Another example is that the automatic opening and closing function can be realized through the control circuit. However, in the case of control system errors, the fixed timing of the opening and closing of the mechanical switch and the power semiconductor switch cannot be guaranteed, the aforementioned risks might be still brought about, so the design needs to be optimized.

SUMMARY

An object of the present disclosure is to provide a solid state circuit breaker to at least partially solve the above problems.

In a first aspect of the present disclosure, there is provided a solid state circuit breaker, connected to a circuit to be protected, the solid state circuit breaker comprises: a first switch connected in the circuit to be protected; a second switch connected in series with the first switch in the circuit to be protected; an operation switch connected to the second switch, the second switch being closed in a case that the operating switch is in a closed position, and the second switch being opened in a case that the operating switch is in an opened position; a micro switch connected to the operation switch, and cable of being driven to a predetermined opened position by the operation switch during the process of the operation switch being switched from the closed position to the opened position; a position detection circuit having an input terminal connected to the micro switch, the position detection circuit being capable of generating an opening feedback signal in a case that the micro switch is driven to the predetermined opened position; a control unit having a first input terminal connected to an output terminal of the position detection circuit to receive the opening feedback signal, the control unit being capable of generating a predetermined opening signal based on the opening feedback signal; and a first on-off circuit having an input terminal connected to a first output terminal of the control unit to receive the predetermined opening signal and an output terminal connected to a control terminal of the first switch to open the first switch under the control of the predetermined opening signal.

The solid state circuit breaker according to embodiments of the present disclosure, by using a micro switch, can control the first switch to be opened before the second switch is opened in the case in a case that the operation switch has not been switched from the closed position to the opened position, so that the second switch will not turn off the current when it is opened, thereby protecting the contacts of the second switch.

In some embodiments, during the process of the operation switch being switched from the opened position to the closed position, the micro switch is cable of being driven to a predetermined closed position by the operation switch, the position detection circuit is cable of generating a closing feedback signal in a case that the micro switch is driven to the predetermined closed position, the control unit is cable of generating a predetermined closing signal based on the closing feedback signal, and the first on-off circuit closes the first switch under the control of the predetermined closing signal. In such an embodiment, the micro switch can control the first switch to be closed after the second switch is closed in the case in a case that the operation switch has not been switched from the opened position to the closed position, so that the second switch will not turn on the current when it is closed, thereby protecting the contacts of the second switch.

In some embodiments, the first switch comprises: a first NMOS transistor group, wherein the gate of each NMOS transistor is connected to the output terminal of the first on-off circuit and the drain of each NMOS transistor is connected to the circuit to be protected; a second NMOS transistor group, wherein the gate of each NMOS transistor is connected to the output terminal of the first on-off circuit and the drain of each NMOS transistor is connected to the second switch; and a resistor group, having a first terminal connected to the source of each NMOS transistor in the first NMOS transistor group and a second terminal connected to the source of each NMOS transistor in the second NMOS transistor group. In such an embodiment, the first switch composed of a first NOMS transistor group, a second NMOS transistor group and a resistor group can reliably turn on and off the circuit to be protected under the control of the control unit.

In some embodiments, the solid state circuit breaker further comprises: a first voltage detection circuit having an input terminal connected to a first terminal of the first switch to generate a first voltage feedback signal based on the voltage magnitude of a first voltage at the first terminal of the first switch, and an output terminal connected to a second input terminal of the control unit; a second voltage detection circuit having an input terminal connected to a node between a second terminal of the first switch and a first terminal of the second switch to generate a second voltage feedback signal based on the voltage magnitude of a second voltage at the node, and an output terminal connected to a third input terminal of the control unit; a third voltage detection circuit having an input terminal connected to a second terminal of the second switch to generate a third voltage feedback signal based on the voltage magnitude of a third voltage at the second terminal of the second switch, and an output terminal connected to a fourth input terminal of the control unit; and a current detection circuit having an input terminal connected to the resistor group to generate a current feedback signal based on the magnitude of the current passing through the resistor group, and an output terminal connected to a fifth input of the control unit. In such an embodiment, the on-off state of the first switch and the second switch can be reliably detected with a plurality of voltage detection circuits and current detection circuits.

In some embodiments, in a case that the magnitude of the current passing through the resistor group is greater than a predetermined protection threshold, the control unit is capable of generating an opening control signal based on the first voltage feedback signal, the second voltage feedback signal, the third voltage feedback signal and the current feedback signal, and in a case that the magnitude of the current passing through the resistor group is less than a predetermined protection threshold, the control unit is capable of generating an closing control signal based on the first voltage feedback signal, the second voltage feedback signal, the third voltage feedback signal and the current feedback signal. In such an embodiment, the control unit can reliably control the first switch to be closed and opened according to the magnitude of the current in the circuit to be protected.

In some embodiments, the solid state circuit breaker further comprises a second on-off circuit having an input terminal connected to the second output terminal of the control unit and an output terminal connected to a control terminal of the second switch, and in a case that the second switch is closed, the first on-off circuit is cable of opening and closing the first switch respectively under the control of the opening control signal and the closing control signal, and in a case that the first switch is opened, the second on-off circuit is cable of opening the second switch under the control of the opening control signal. In such an embodiment, the control unit can reliably close and open the first switch and the second switch according to a predetermined timing.

In some embodiments, the first on-off circuit comprises a first isolation unit and a first driving unit, an input terminal of the first isolation unit is connected to the first output terminal of the control unit, the first isolation unit is cable of isolating the predetermined opening signal, the opening control signal, and the closing control signal to obtain an isolated predetermined opening signal, an isolated opening control signal, and an isolated closing control signal, an input terminal of the first driving unit is connected to an output terminal of the first isolation unit to receive the isolated predetermined opening signal, the isolated opening control signal, and the isolated closing control signal, an output terminal of the first driving unit is connected to the first switch, the first driving unit is cable of driving the first switch to be opened in a case that a received signal is an isolated predetermined opening signal, and the first driving unit is cable of driving the first switch to be opened in a case that a received signal is an isolated opening control signal, and the first driving unit is cable of driving the first switch to be closed in a case that a received signal is an isolated closing control signal. In such an embodiment, the first switch can be reliably driven to be closed and opened under the control of the control unit with the first isolation unit and the first driving unit.

In some embodiments, the solid state circuit breaker further comprises a short-circuit protection unit having a first terminal connected to the current detection circuit and a second terminal connected to the first driving unit, the short-circuit protection unit is cable of generating a short-circuit opening signal and output it to the first driving unit in a case that the magnitude of the current passing through the resistance group is greater than a predetermined protection threshold, so that the first driving unit drives the first switch to be opened. In such an embodiment, in the case of a short circuit or other faults in the circuit to be protected, the first switch can be directly controlled to be opened with the short-circuit protection unit, thereby reliably protecting the circuit to be protected.

In some embodiments, the second on-off circuit comprises a second isolation unit and a second drive unit, an input terminal of the second isolation unit is connected to the second output terminal of the control unit, the second isolation unit is cable of isolating the opening control signal and the closing control signal to obtain an isolated opening control signal and an isolated closing control signal, an input terminal of the second drive unit is connected to an output terminal of the second isolation unit to receive the isolated opening control signal and the isolated closing control signal, and an output terminal of the second driving unit is connected to the second switch, the second driving unit is cable of driving the second switch to be opened in a case that a received signal is an isolated opening control signal, and the second drive unit is cable of driving the second switch to be closed in a case that a received signal is an isolated closing control signal. In such an embodiment, the second switch can be reliably controlled to be closed and opened under the control of the control unit with the second isolation unit and the second driving unit.

It should be understood that the contents described in this content section are not intended to limit the key features or important features of the embodiments of the present disclosure, nor are they intended to limit the scope of the present disclosure. Other features of the present disclosure will become readily understood from the following description.

BRIEF DESCRIPTION OF THE DRAWINGS

The above and other features, advantages and aspects of the various embodiments of the present disclosure will become more apparent in conjunction with the accompanying drawings and with reference to the following detailed description. In the drawings, like or similar reference numerals denote like or similar elements, wherein:

FIG. 1 shows a schematic structural diagram of a solid state circuit breaker according to an embodiment of the present disclosure.

DETAILED DESCRIPTION

The preferred embodiments of the present disclosure will be described in more detail below with reference to the accompanying drawings. Although the preferred embodiments of the present disclosure are shown in the drawings, it should be understood that the present disclosure can be implemented in various forms and should not be limited by the embodiments set forth herein. Instead, these embodiments are provided to make the present disclosure more thorough and complete, and to fully convey the scope of the present disclosure to those skilled in the art.

The term "including" and its variations used in this article indicate open inclusion, that is, "including but not limited to". Unless otherwise stated, the term "or" means "and/or". The term "based on" means "at least partially based on". The terms "an example embodiment" and "an embodiment" mean "at least one example embodiment". The term "another embodiment" means "at least one additional embodiment". The terms "first", "second", etc. can refer to different or identical objects.

As described above, whether the mechanical switch and power semiconductor switch of the solid state circuit breaker are controlled manually or by the control circuit, there is a risk that the mechanical switch will turn on or off the current, thereby affecting the contact life. Embodiments of the present disclosure provide a solid state circuit breaker, in which a micro switch is connected to an operation switch to control a first switch to open before a second switch opens during the process of the operation switch driving the second switch to open, and to control the first switch to close after the second switch closes during the process of the operation switch driving the second switch to close, thereby ensuring that the first switch and the second switch can be closed and opened strictly according to a predetermined timing. Hereinafter, the principle of the present disclosure will be described in conjunction with FIG. 1.

FIG. 1 shows a schematic structural diagram of a solid state circuit breaker 100 according to an embodiment of the present disclosure. As shown in FIG. 1, the solid state circuit breaker 100 described herein is connected to a circuit to be protected and generally comprises a first switch 11, a second switch 12, an operation switch 13, a micro switch 14, a position detection circuit 15, a control unit 16, and a first on-off circuit 17. The first switch 11 is connected in the circuit to be protected. The second switch 12 is connected in series with the first switch 11 in the circuit to be protected. The operation switch 13 is connected to the second switch 12 and can drive the second switch 12 to close and open. The second switch 12 is closed when the operation switch 13 is in the closed position, and opened when the operation switch 13 is in the opened position. The micro switch 14 is connected to the operation switch 13. During the process of switching from the closed position to the opened position of the operation switch 13, the micro switch 14 can be driven to a predetermined opened position by the operation switch 13. During the process of switching from the opened position to the closed positions of the operation switch 13, the micro switch 14 can be driven to a predetermined closed position by the operation switch 13. The input terminal of the position detection circuit 15 is connected to the micro switch 14. The position detection circuit 15 can generate an opening feedback signal and a closing feedback signal respectively when the micro switch 14 is driven to the predetermined opened position and the predetermined closed position. The first input terminal of the control unit 16 is connected to the output terminal of the position detection circuit 15 to receive the opening feedback signal, and the control unit 16 can generate a predetermined opening signal and a predetermined closing signal based on the opening feedback signal and the closing feedback signal, respectively. The input terminal of the first on-off circuit 17 is connected to the first output terminal of the control unit 16 to receive the predetermined opening signal and the predetermined closing signal. The output terminal of the first on-off circuit 17 is connected to the control terminal of the first switch 11 to open the first switch 11 under the control of the predetermined opening signal or close the first switch 11 under the control of the predetermined closing signal.

In an embodiment, the operation switch 13 uses a knob switch. When the operation switch 13 starts to be driven, it is configured to have a certain idle stroke, and the operation switch 13 is driven to reach a critical position after completing the idle stroke. In a case that the operation switch 13 reaches the critical position and continues to be driven, the micro switch 14 starts to be driven by the operation switch 13 until it reaches the predetermined opened position or the predetermined closed position. The idle stroke as described above can cause the micro switch 14 to be driven to the predetermined opened position before the contact of the second switch 12 is driven to the opened position by the operation switch 13, and then the position detection circuit 15 can quickly cooperate with the control unit 16 and the first on-off circuit 17 to control the first switch 11 to be opened before the second switch 12 is opened, so that no current flows through the contact of the second switch 12 when it is opened. It should be understood that based on the teachings given in the present disclosure, those of ordinary skill in the art can envision other ways to achieve the above functions, which are all within the scope of the present disclosure.

In other embodiments, the operation switch 13 may be a push button switch. It should be understood that, based on the teachings given in the present disclosure, those of ordinary skill in the art can envision other types of operation switches 13 to achieve the above functions, which implementations are within the scope of the present disclosure.

In an embodiment, as shown in FIG. 1, the first switch 11 comprises a first NMOS transistor group 111, a second NMOS transistor group 112, and a resistor group 113. The gate of each NMOS transistor in the first NMOS transistor group 111 is connected to the output terminal of the first on-off circuit 17 and the drain of each NMOS transistor is connected to the circuit to be protected. The gate of each NMOS transistor in the second NMOS transistor group 112 is connected to the output terminal of the first on-off circuit 17 and the drain of each NMOS transistor is connected to the second switch 12. The first end of the resistor group 113 is connected to the source of each NMOS transistor in the first NMOS transistor group 111 and the second end is connected to the source of each NMOS transistor in the second NMOS transistor group 112. Each NMOS transistor in the first NMOS transistor group 111 and the second NMOS transistor group 112 can be turned on and off under the control of the first on-off circuit 17. The second switch 12 is a mechanical switch that can be driven by the operation switch 13 and performs closing and opening operations by turning on and separating the contacts.

In other embodiments, the first switch 11 may be an IGBT transistor group with a resistor group. It should be understood that, based on the teachings given in the present disclosure, those of ordinary skill in the art can envision other types of first switches 11 and second switches 12 to achieve the above functions, which implementations are within the scope of the present disclosure.

In an embodiment, as shown in FIG. 1, the solid state circuit breaker 100 further comprises a first voltage detection circuit 21, a second voltage detection circuit 22, a third voltage detection circuit 23, and a current detection circuit 24. The input terminal of the first voltage detection circuit 21 is connected to the first terminal of the first switch 11 and the output terminal is connected to the second input terminal of the control unit 16. The first voltage detection circuit 21 can generate a first voltage feedback signal based on the voltage magnitude of a first voltage at the first terminal of the first switch 11 and output it to the second input terminal of the control unit 16. The input terminal of the second voltage detection circuit 22 is connected to a node between the second terminal of the first switch 11 and the first terminal of the second switch 12, and the output terminal is connected to the third input terminal of the control unit 16. The second voltage detection circuit 22 can generate a second voltage feedback signal based on the voltage magnitude of a second voltage at the node and output it to the third input terminal of the control unit 16. The input terminal of the third voltage detection circuit 23 is connected to the second terminal of the second switch 12 and the output terminal is connected to the fourth input terminal of the control unit 16. The third voltage detection circuit 23 can generate a third voltage feedback signal based on the voltage magnitude of a third voltage at the second terminal of the second switch 12 and output it to the fourth input terminal of the control unit 16. The input terminal of the current detection circuit 24 is connected to the resistor group 113 and the output terminal is connected to the fifth input terminal of the control unit 16. The current detection circuit 24 can generate a current feedback signal based on the magnitude of the current passing through the resistor group 113 and output it to the fifth input terminal of the control unit 16.

The first voltage detection circuit 21, the second voltage detection circuit 22, and the third voltage detection circuit 23 can monitor the on-off status of the first switch 11 and the second switch 12 in real time. The current detection circuit 24 can monitor the working status of the circuit to be protected in real time. It should be understood that based on the teachings given in the present disclosure, those of ordinary skill in the art can envision other ways to achieve the above functions, which implementations are all within the scope of the present disclosure.

In an embodiment, in the case of a short circuit fault in the circuit to be protected, the magnitude of the current through the resistor group 113 will be greater than a predetermined protection threshold. At this point, the control unit 16 can generate an opening control signal based on the first voltage feedback signal, the second voltage feedback signal, the third voltage feedback signal and the current feedback signal.

When the circuit to be protected returns to normal operation, the magnitude of the current through the resistor group 113 will return to less than the predetermined protection threshold. At this point, the control unit 16 can generate a closing control signal based on the first voltage feedback signal, the second voltage feedback signal, the third voltage feedback signal and the current feedback signal.

In an embodiment, as shown in FIG. 1, the solid state circuit breaker 100 further includes a second on-off circuit 18. The input terminal of the second on-off circuit 18 is connected to the second output terminal of the control unit 16 and the output terminal is connected to the control terminal of the second switch 12. When the second switch 12 is closed, the first on-off circuit 17 can open and close the first switch 11 respectively under the control of the opening control signal and the closing control signal. When the first switch 11 is opened, the second on-off circuit 18 can open the second switch 12 under the control of the opening control signal.

Under the control of the control unit 16, the first on-off circuit 17 and the second on-off circuit 18 strictly follow the predetermined operation timing of closing the second switch 12 first and then the first switch 11 under necessary conditions and opening the first switch 11 first and then the second switch 12 under necessary conditions, so as to ensure that the current will not be turned on and off during the process of closing and opening the second switch 12, thereby avoiding the contact of the second switch 12 being affected by the arc.

In an embodiment, in the case that a short circuit fault occurs in the circuit to be protected and the operation switch 13 still drives the second switch to be closed, the first voltage detection circuit 21, the second voltage detection circuit 22, the third voltage detection circuit 23 and the current detection circuit 24 can still feed back the on-off state of the first switch 11 and the second switch 12 and the operating state of the circuit to be protected to the control unit in the manner described above, so that the control unit can control in time the first on-off circuit 17 and the second on-off circuit 18 to open the first switch 11 and the second switch 12 in this order, thereby achieving the protection function of the solid state circuit breaker 100 for the circuit to be protected.

In an embodiment, as shown in FIG. 1, the first on-off circuit 17 comprises a first isolation unit 171 and a first driving unit 172. The input terminal of the first isolation unit 171 is connected to the first output terminal of the Control Unit 16. The first isolation unit 171 can isolate the predetermined opening signal, the opening control signal, and the closing control signal to obtain an isolated predetermined opening signal, an isolated opening control signal, and an isolated closing control signal. The input terminal of the first driving unit 172 is connected to the output terminal of the first isolation unit 171 to receive the isolated predetermined opening signal, an isolated opening control signal, and an isolated closing control signal, and the output terminal is connected to the first switch 11. The first driving unit 172 can drive the first switch 11 to be opened when a received signal is the isolated predetermined opening signal. The first driving unit 172 can drive the first switch 11 to be closed when a received signal is the isolated closing control signal.

In an embodiment, as shown in FIG. 1, the second on-off circuit 18 comprises a second isolation unit 181 and a second driving unit 182. The input terminal of the second isolation unit 181 is connected to the second output terminal of the control unit 16. The second isolation unit 181 can isolate the opening control signal and the closing control signal to obtain an isolated opening control signal and an isolated closing control signal. The input terminal of the second drive unit 182 is connected to the output terminal of the second isolation unit 181 to receive an isolated opening control signal and an isolated closing control signal, and the output terminal is connected to the second switch 12. The second drive unit 182 can drive the second switch 12 to be opened when a received signal is the isolated opening control signal. The second drive unit 182 can drive the second switch 12 to be closed when a received signal is the isolated closing control signal.

In an embodiment, as shown in FIG. 1, the solid state circuit breaker 100 further comprises a short-circuit protection unit 19. The first terminal of the short-circuit protection unit 19 is connected to the current detection circuit 24 and the second terminal is connected to the first driving unit 172. The short-circuit protection unit 19 can generate a short-circuit opening signal when the magnitude of the current passing through the resistor group 113 is greater than a predetermined protection threshold and output it to the first driving unit 172, so that the first driving unit 172 drives the first switch 11 to be opened. In this way, the short-circuit protection unit 19 can directly control the first driving unit 172 to quickly turn off the circuit to be protected without relying on the control of the control unit 16, greatly improving the safety performance of the circuit to be protected.

The above has described various embodiments of the present disclosure. The above description is exemplary, not exhaustive, and is not limited to the disclosed embodiments. Without departing from the scope and spirit of the described embodiments, many modifications and changes will be apparent to those of ordinary skill in the field. The choice of terms used in this article is intended to best explain the principles, practical applications, or technical improvements in the market of each embodiment, or to enable other ordinary technicians in the field to understand the various embodiments disclosed herein.

What is claimed is:

1. A solid state circuit breaker, connected to a circuit to be protected, wherein the solid state circuit breaker comprises:

a first switch connected in series with the circuit to be protected;

a second switch connected in series with the first switch in the circuit to be protected;

an operation switch connected to the second switch, the second switch being closed in a case that the operation switch is in a closed position, and the second switch being opened in a case that the operation switch is in an opened position;

a micro switch connected to the operation switch, and capable of being driven to a predetermined opened position by the operation switch during a process of the operation switch being switched from the closed position to the opened position, wherein during a process of the operation switch being switched from the opened position to the closed position, the micro switch is configured to be driven to a predetermined closed position by the operation switch;

a position detection circuit having an input terminal connected to the micro switch, the position detection circuit being capable of generating an opening feedback signal in a case that the micro switch is driven to the predetermined opened position;

a control unit having a first input terminal connected to an output terminal of the position detection circuit to receive the opening feedback signal, the control unit being capable of generating a predetermined opening signal based on the opening feedback signal; and a first on-off circuit having an input terminal connected to a first output terminal of the control unit to receive the predetermined opening signal and an output terminal connected to a control terminal of the first switch to open the first switch under a control of the predetermined opening signal.

2. The solid state circuit breaker of claim 1, wherein during a process of the operation switch being switched from the opened position to the closed position, the micro switch is capable of being driven to a predetermined closed position by the operation switch, the position detection circuit is capable of generating a closing feedback signal in a case that the micro switch is driven to the predetermined closed position, the control unit is capable of generating a predetermined closing signal based on the closing feedback signal, and the first on-off circuit closes the first switch under a control of the predetermined closing signal.

3. The solid state circuit breaker of claim 1, wherein the first switch comprises:

a first NMOS transistor group, wherein a gate of each NMOS transistor is connected to the output terminal of the first on-off circuit and a drain of each NMOS transistor is connected to the circuit to be protected;

a second NMOS transistor group, wherein a gate of each NMOS transistor is connected to the output terminal of the first on-off circuit and a drain of each NMOS transistor is connected to the second switch; and a resistor group having a first terminal connected to a source of each NMOS transistor in the first NMOS transistor group and a second terminal connected to the source of each NMOS transistor in the second NMOS transistor group.

4. The solid state circuit breaker of claim 3, wherein the solid state circuit breaker further comprises:

a first voltage detection circuit, having an input terminal connected to a first terminal of the first switch to generate a first voltage feedback signal based on a voltage magnitude of a first voltage at the first terminal of the first switch, and an output terminal connected to a second input terminal of the control unit;

a second voltage detection circuit having an input terminal connected to a node between a second terminal of the first switch and a first terminal of the second switch to generate a second voltage feedback signal based on the voltage magnitude of a second voltage at the node, and an output terminal connected to a third input terminal of the control unit;

a third voltage detection circuit having an input terminal connected to a second terminal of the second switch to generate a third voltage feedback signal based on the voltage magnitude of a third voltage at the second terminal of the second switch, and an output terminal connected to a fourth input terminal of the control unit; and a current detection circuit, having an input terminal connected to the resistor group to generate a current feedback signal based on a magnitude of current passing through the resistor group, and an output terminal connected to a fifth input of the control unit.

5. The solid state circuit breaker of claim 4, wherein, in a case that the magnitude of the current passing through the resistor group is greater than a predetermined protection threshold, the control unit is capable of generating an opening control signal based on the first voltage feedback signal, the second voltage feedback signal, the third voltage feedback signal and the current feedback signal, and in a case that the magnitude of the current passing through the resistor group is less than a predetermined protection threshold, the control unit is capable of generating a closing control signal based on the first voltage feedback signal, the second voltage feedback signal, the third voltage feedback signal and the current feedback signal.

6. The solid state circuit breaker of claim 5, wherein the solid state circuit breaker further comprises a second on-off circuit having an input terminal connected to a second output terminal of the control unit and an output terminal connected to a control terminal of the second switch, and in a case that the second switch is closed, the first on-off circuit is capable of opening and closing the first switch respectively under a control of the opening control signal and the closing control signal, and in a case that the first switch is opened, the second on-off circuit is capable of opening the second switch under the control of the opening control signal.

7. The solid state circuit breaker of claim 6, wherein the first on-off circuit comprises a first isolation unit and a first driving unit, an input terminal of the first isolation unit is connected to the first output terminal of the control unit, the first isolation unit is capable of isolating the predetermined opening signal, the opening control signal, and the closing control signal to obtain an isolated predetermined opening signal, an isolated opening control signal, and an isolated closing control signal, an input terminal of the first driving unit is connected to an output terminal of the first isolation unit to receive the isolated predetermined opening signal, the isolated opening control signal, and the isolated closing control signal, an output terminal of the first driving unit is connected to the first switch, the first driving unit is capable of driving the first switch to be opened in a case that a received signal is an isolated predetermined opening signal, and the first driving unit is capable of driving the first switch to be opened in a case that a received signal is an isolated opening control signal, and the first driving unit is capable of driving the first switch to be closed in a case that a received signal is an isolated closing control signal.

8. The solid state circuit breaker of claim 7, wherein the solid state circuit breaker further comprises a short-circuit protection unit having a first terminal connected to the current detection circuit and a second terminal connected to the first driving unit, the short-circuit protection unit is capable of generating a short-circuit opening signal and output it to the first driving unit in a case that the magnitude of the current passing through the resistor group is greater than a predetermined protection threshold, so that the first driving unit drives the first switch to be opened.

9. The solid state circuit breaker of claim 6, wherein the second on-off circuit comprises a second isolation unit and a second drive unit, an input terminal of the second isolation unit is connected to the second output terminal of the control unit, the second isolation unit is capable of isolating the opening control signal and the closing control signal to obtain an isolated opening control signal and an isolated closing control signal, an input terminal of the second drive unit is connected to an output terminal of the second isolation unit to receive the isolated opening control signal and the isolated closing control signal, and an output terminal of the second drive unit is connected to the second switch, the driving drive unit is capable of driving the second switch to be opened in a case that a received signal is an isolated opening control signal, and the second drive unit is capable of driving the second switch to be closed in a case that a received signal is an isolated closing control signal.

10. The solid state circuit breaker of claim 1, wherein the micro switch is configured to be driven to the predetermined closed position before the operation switch is closed.

11. The solid state circuit breaker of claim 1, wherein the position detection circuit is configured to generate a closing feedback signal after the micro switch is driven to the predetermined closed position.

12. The solid state circuit breaker of claim 1, wherein the control unit is configured to generate a predetermined closing signal after the micro switch is driven to the predetermined closed position.

13. The solid state circuit breaker of claim 1, wherein the first on-off circuit is configured to close the first switch after the micro switch is driven to the predetermined closed position.

14. The solid state circuit breaker of claim 1, further comprising:

a first voltage detection circuit, having an input terminal connected to a first terminal of the first switch to generate a first voltage feedback signal based on a voltage magnitude of a first voltage at the first terminal of the first switch, and an output terminal connected to a second input terminal of the control unit.

15. The solid state circuit breaker of claim 1, further comprising:

a second voltage detection circuit having an input terminal connected to a node between a second terminal of the first switch and a first terminal of the second switch to generate a second voltage feedback signal based on a voltage magnitude of a second voltage at the node, and an output terminal connected to a third input terminal of the control unit.

16. The solid state circuit breaker of claim 1, further comprising:

a third voltage detection circuit having an input terminal connected to a second terminal of the second switch to generate a third voltage feedback signal based on a voltage magnitude of a third voltage at the second terminal of the second switch, and an output terminal connected to a fourth input terminal of the control unit.

17. The solid state circuit breaker of claim 1, wherein the micro switch is separate from the operation switch.

18. A solid state circuit breaker, connected to a circuit to be protected, wherein the solid state circuit breaker comprises:

a first switch connected in series with the circuit to be protected;

a second switch connected in series with the first switch in the circuit to be protected;

an operation switch connected to the second switch, the second switch configured to be closed in a case that the operation switch is in a closed position, and the second switch configured to be opened in a case that the operation switch is in an opened position;

a micro switch connected to the operation switch, the micro switch configured to be driven to a predetermined opened position by the operation switch during a process of the operation switch being switched from the closed position to the opened position, wherein during a process of the operation switch being switched from the opened position to the closed position, the micro switch is configured to be driven to a predetermined closed position by the operation switch; and a control unit configured to cause the first switch to open after the micro switch is driven to the predetermined opened position.

19. The solid state circuit breaker of claim 18, further comprising:

a position detection circuit having an input terminal connected to the micro switch, the position detection circuit configured to generate an opening feedback signal in a case that the micro switch is driven to the predetermined opened position, wherein the control unit has a first input terminal connected to an output terminal of the position detection circuit to receive the opening feedback signal, the control unit configured to generate a predetermined opening signal based on the opening feedback signal, and the solid state circuit breaker further comprising a first on-off circuit having an input terminal connected to a first output terminal of the control unit to receive the predetermined opening signal and an output terminal connected to a control terminal of the first switch to open the first switch under a control of the predetermined opening signal.

20. The solid state circuit breaker of claim 18, wherein the micro switch is configured to be driven to the predetermined closed position before the operation switch is closed.

* * * * *